US009065889B2

(12) United States Patent
Kurashima

(10) Patent No.: US 9,065,889 B2
(45) Date of Patent: Jun. 23, 2015

(54) TELEPHONE RELAY APPARATUS, TELEPHONE RELAY METHOD, AND PROGRAM

(75) Inventor: Akihisa Kurashima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 65 days.

(21) Appl. No.: 13/378,629

(22) PCT Filed: Apr. 30, 2010

(86) PCT No.: PCT/JP2010/003084
§ 371 (c)(1),
(2), (4) Date: Dec. 15, 2011

(87) PCT Pub. No.: WO2010/150454
PCT Pub. Date: Dec. 29, 2010

(65) Prior Publication Data
US 2012/0087487 A1    Apr. 12, 2012

(30) Foreign Application Priority Data

Jun. 24, 2009  (JP) .................................. 2009-150101

(51) Int. Cl.
*H04M 3/533* (2006.01)
*H04M 7/00* (2006.01)

(52) U.S. Cl.
CPC .................................. *H04M 7/0072* (2013.01)

(58) Field of Classification Search
CPC ............. H04W 76/022; H04W 76/028; H04M 3/42042; H04M 3/4228; H04M 7/006; H04M 2207/206; H04M 3/5235; H04M 1/24; H04M 3/2254; H04M 2201/60; H04M 3/533; H04M 3/42059; H04M 1/663; H04M 3/493; H04M 11/002; H04M 15/38; H04M 1/57; H04M 2242/22; H04N 2201/0067; H04Q 3/00; H04Q 3/0004

USPC ......... 379/22.06, 100.09, 152, 304, 336, 338, 379/29.09, 88.14, 88.19, 88.2, 88.21, 93.03, 379/93.15, 93.23, 100.13, 118, 120, 142.14, 379/207.14, 207.15, 245
See application file for complete search history.

(56) References Cited

U.S. PATENT DOCUMENTS

2007/0153776 A1* 7/2007 Joseph et al. .................. 370/356
2007/0253440 A1* 11/2007 Huang ........................... 370/463

FOREIGN PATENT DOCUMENTS

| JP | 2004040653 A | 2/2004 |
|---|---|---|
| JP | 2004153544 A | 5/2004 |
| JP | 2005026831 A | 1/2005 |
| JP | 2007318343 A | 12/2007 |
| JP | 2009100166 A | 5/2009 |
| WO | 2006003758 A | 1/2006 |

OTHER PUBLICATIONS

International Search Report for PCT/JP2010/003084 mailed Jun. 15, 2010.

* cited by examiner

*Primary Examiner* — Akelaw Teshale
(74) *Attorney, Agent, or Firm* — Sughrue Mion, PLLC

(57) ABSTRACT

A telephone relay apparatus 200 receives a connection request from a first telephone terminal 100 to a second telephone terminal 300. The connection request includes phone numbers of the first telephone terminal 100 and the second telephone terminal 300. The telephone relay apparatus 200 stores phone numbers of a plurality of telephone terminals and codec information that indicates types of audio codecs of the telephone terminals so that the phone numbers and the code: information correspond to each other. When connecting to the first telephone terminal 100, the telephone relay apparatus 200 reads out codec information that corresponds to the phone number of the second telephone terminal, and then transmits the read-out codec information to the first telephone terminal 100. The first telephone terminal 100 performs a call process using an audio codec that corresponds to the codec information transmitted from the telephone relay apparatus 200.

8 Claims, 12 Drawing Sheets

| PHONE NUMBER | CODEC INFORMATION |
|---|---|
| 050-xxxx-xxxx | G. 711<br>G. 729 |
| 090-xxxx-xxxx | G. 711 |
| 080-xxxx-xxxx | G. 729 |
| ... | ... |

| PHONE NUMBER FOR ORIGINATING A FIRST CALL | PHONE NUMBER FOR ORIGINATING A SECOND CALL |
|---|---|
| 050−×××−×××× | 050−×××−×××× |
| 050−×××−×××× | 050−×××−×××× |
| 050−×××−×××× | 050−×××−×××× |
| ... | ... |

US 9,065,889 B2

TELEPHONE RELAY APPARATUS, TELEPHONE RELAY METHOD, AND PROGRAM

TECHNICAL FIELD

The present invention relates to a telephone relay apparatus, a telephone relay method, and a program, which can relay a phone call between a first telephone terminal and a second telephone terminal.

BACKGROUND ART

A caller of a telephone may make a call origination request through a computer terminal or the like. In this case, the computer terminal sends a telephone relay apparatus information that specifies the phone number of an origination telephone terminal (that is, a telephone terminal that a caller uses) and information that specifies the phone number of a destination telephone terminal. In this case, the telephone relay apparatus calls the origination telephone terminal as well as the destination telephone terminal. Further, the origination telephone terminal and the destination telephone terminal perform a phone call process through the telephone relay apparatus.

For example, a Request For Comment (RFC) 3725 describes a third party call control method. According to this method, when a portable terminal instructs the telephone relay apparatus about a call destination through a data communication network, the telephone relay apparatus originates a call to the call destination and the portable terminal that has instructed.

Further, Patent Document 1 describes that the telephone relay apparatus pre-stores identification information of a telephone apparatus that is a call origination, and a phone number of a call destination. When receiving an originating call from the telephone apparatus, the telephone relay apparatus establishes a call connection, and performs a call relay process by reading out the phone number that corresponds to the identification information of the telephone terminal and originating a call to the phone number.

RELATED DOCUMENT

Patent Document

[Patent Document 1] International Publication No. WO 2006/003758

DISCLOSURE OF THE INVENTION

When a first telephone terminal and a second telephone terminal are IP telephones, audio data is encoded using a codec, and transmitted to a communication network as audio packets. When the first telephone terminal and the second telephone terminal have different encoding methods, that is, different audio codecs, the telephone relay apparatus is required to re-encode the audio packet transmitted from one of the first and second telephone terminals in conformity with the audio codec of the other of the first and second telephone terminals. However, such a process causes a heavy load for the telephone relay apparatus.

The present invention provides a telephone relay apparatus, a telephone relay method, and a program, which can suppress the increase of the load for the telephone relay apparatus.

According to the present invention, there is provided a telephone relay apparatus comprising a codec storage unit storing phone numbers of a plurality of telephone terminals and codec information that indicates types of audio codecs provided in the telephone terminals so that the phone numbers and the codec information correspond to each other; a connection request reception unit receiving a connection request, which includes the phone numbers of a first telephone terminal and a second telephone terminal, from the first telephone terminal to the second telephone terminal; a codec readout unit reading out the codec information that corresponds to the phone number of the second telephone terminal from the codec storage unit; and a connection processing unit transmitting the codec information readout by the codec reading unit to the first telephone terminal and connecting to the first telephone terminal and the second telephone terminal.

According to the present invention, there is provided a telephone relay method comprising making a codec storage unit store phone numbers of a plurality of telephone terminals and codec information that indicates types of audio codecs provided in the telephone terminals so that the phone numbers and the codec information correspond to each other; receiving a connection request, which includes the phone numbers of a first telephone terminal and a second telephone terminal, from the first telephone terminal to the second telephone terminal by a telephone relay apparatus; reading out the codec information that corresponds to the phone number of the second telephone terminal from the codec storage unit by the telephone relay apparatus; and transmitting the read-out codec information to the first telephone terminal and connecting to the first telephone terminal and the second telephone terminal by the telephone relay apparatus.

According to the present invention, there is provided a program for making a computer function as a telephone relay apparatus that relays a phone call between a first telephone terminal and a second telephone terminal, the program makes the computer realize the functions of: connecting to a codec storage unit storing phone numbers of a plurality of telephone terminals and codec information that indicates types of audio codecs of the telephone terminals so that the phone numbers and the codec information correspond to each other; receiving a connection request, which includes the phone numbers of the first telephone terminal and the second telephone terminal, from the first telephone terminal to the second telephone terminal; reading out the codec information that corresponds to the phone number of the second telephone terminal from the codec storage unit; and transmitting the read-out codec information to the first telephone terminal and connecting to the first telephone terminal and the second telephone terminal.

According to the present invention, since the first telephone terminal and the second telephone terminal use the same audio codecs, the telephone relay apparatus is not required to perform the re-encoding. Accordingly, the increase of the load for the telephone relay apparatus can be suppressed.

BRIEF DESCRIPTION OF THE DRAWINGS

The above and other objects, features and advantages of the invention will be more apparent from the following detailed description taken in conjunction with the accompanying drawings.

FIG. 3 is a diagram illustrating an example of data stored in a codec storage unit in a table form.

FIG. 4 is a diagram illustrating an example of data stored in a phone number storage unit in a table form.

DESCRIPTION OF EMBODIMENTS

Figure 1:
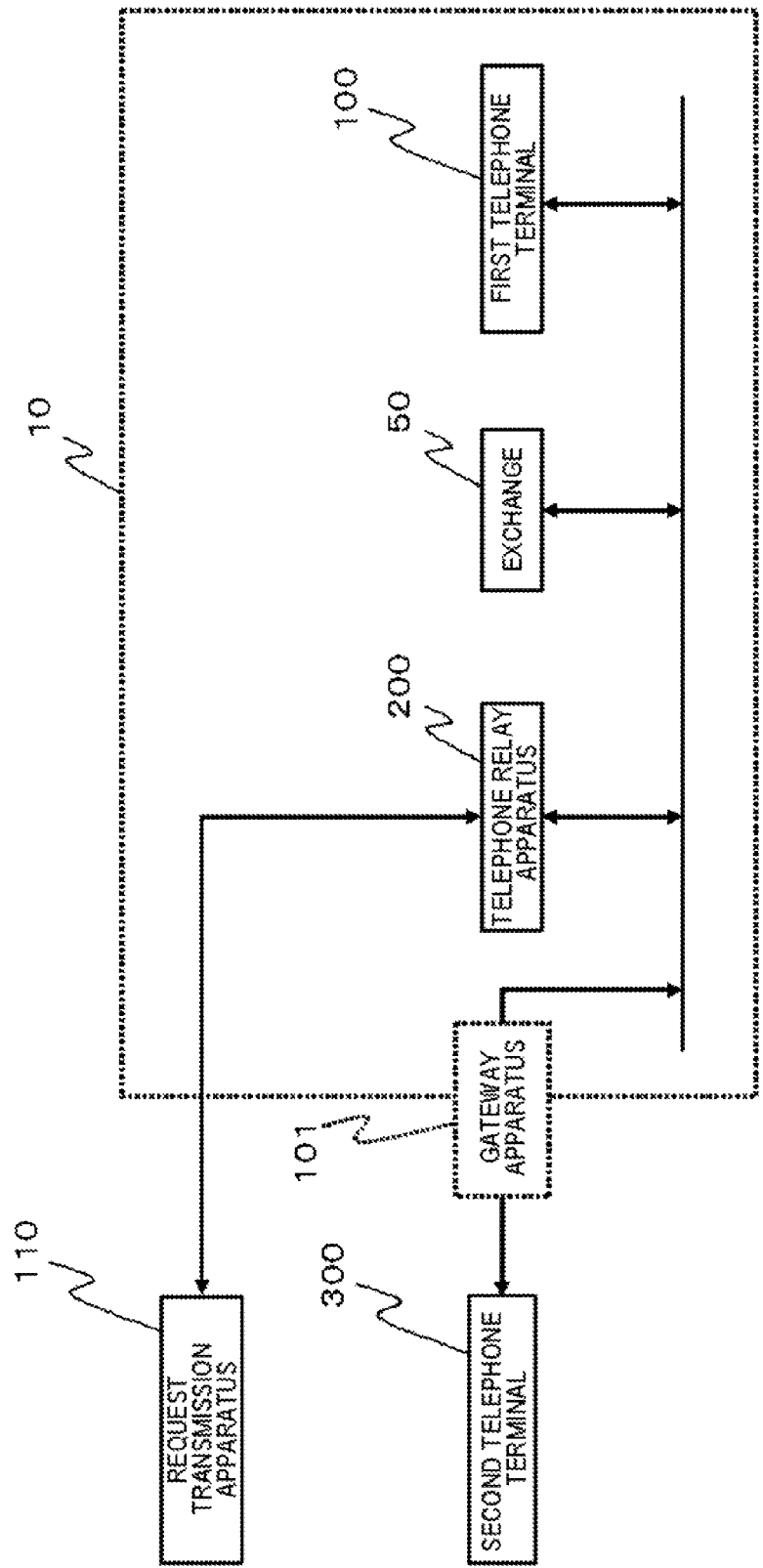
FIG. 1 is a diagram illustrating a use environment of a telephone relay apparatus according to a first embodiment of the invention.

Hereinafter, embodiments of the invention will be described with reference to the accompanying drawings. In all drawings, the same reference numerals are given to the same configuration elements, and the detailed description thereof will not be repeated.

FIG. 1 is a diagram illustrating a use environment of a telephone relay apparatus 200 according to a first embodiment of the invention. The telephone relay apparatus 200 is a apparatus that performs a relay process between the first telephone terminal 100 and the second telephone terminal 300. The first telephone terminal and the telephone relay apparatus 200 are used in a communication network 10 that has an exchange 50. The telephone relay apparatus 200 stores respective phone numbers of a plurality of telephone terminals connected to the communication network 10.

The telephone terminal may be positioned in the communication network 10, or may be connected to the communication network 10 through a gateway apparatus 101. In an example illustrated in the drawing, the second telephone terminal 300 is connected to the communication network 10 through the gateway apparatus 101, and the first telephone terminal 100 is positioned inside the communication network 10. However, the first telephone terminal 100 may be connected to the communication network through the gateway apparatus 101, and the first telephone terminal 100 and the second telephone terminal 300 may be positioned inside the communication network 10. The respective telephone terminals are IP telephones.

The telephone relay apparatus 200 receives a connection request from the first telephone terminal 100 to the second telephone terminal 300. In this embodiment, the connection request is transmitted from a request transmission apparatus 110 (for example, a computer terminal) through a data communication network that is different from the telephone communication network. The request transmission apparatus 110 is operated by a user of the first telephone terminal 100. In this case, it is not necessary that the telephone communication network and the data communication network are physically different from each other, and they may be logically different communication networks.

The connection request includes phone numbers of the first telephone terminal 100 and the second telephone terminal 300. When receiving the connection request, the telephone relay apparatus 200 connects to the first telephone terminal 100 and the second telephone terminal 300. In this embodiment, the telephone relay apparatus 200 connects to the first telephone terminal 100 and the second telephone terminal 300 by originating a first call to the first telephone terminal 100 and originating a second call to the second telephone terminal 300.

The telephone relay apparatus 200 stores phone numbers of a plurality of telephone terminals and codec information that indicates the types of audio codecs of the telephone terminals so that the phone numbers and the codec information correspond to each other. When connecting to the first telephone terminal 100, the telephone relay apparatus 200 reads out the codec information that corresponds to the phone number of the second telephone terminal 300 included in the connection information. Further, the telephone relay apparatus 200 transmits the read-out codec information to the first telephone terminal 100. The first telephone terminal 100 has a plurality of audio codecs. The first telephone terminal 100 performs a call process using the audio codec that corresponds to the codec information transmitted from the telephone relay apparatus 200.

Figure 2:
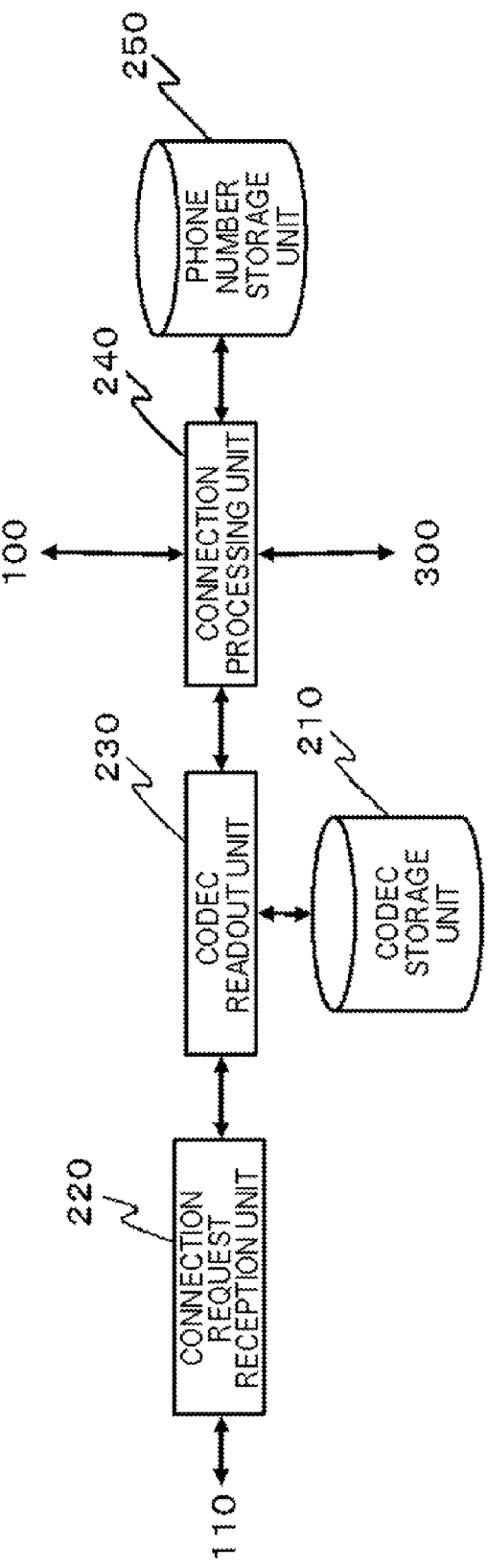
FIG. 2 is a block diagram illustrating a functional configuration of a telephone relay apparatus.

FIG. 2 is a block diagram illustrating a functional configuration of the telephone relay apparatus 200. The telephone relay apparatus 200 includes a codec storage unit 210, a connection request reception unit 220, a codec readout unit 230, and a connection processing unit 240.

The codec storage unit 210 stores the phone numbers of a plurality of telephone terminals and the codec information that indicates the types of the audio codecs of the telephone terminal so that the phone numbers and the codec information correspond to each other.

The connection request reception unit 220 receives the connection request from the first telephone terminal 100 to the second telephone terminal 300. The connection request includes the phone numbers of the first telephone terminal 100 and the second telephone terminal 300. The codec readout unit 230 reads out the codec information which corresponds to the phone number of the second telephone terminal 300 included in the connection request from the codec storage unit 210.

The connection processing unit 240 connects to the first telephone terminal 100 and the second telephone terminal 300. When connecting to the first telephone terminal 100 and the second telephone terminal 300, the connection processing unit 240 performs a negotiation process for determining a communication method with the first telephone terminal 100 and the second telephone terminal 300. During the negotiation process with the first telephone terminal 100, the connection processing unit 240 transmits the codec information read out by the codec readout unit 230 to the first telephone terminal 100.

Further, the telephone relay apparatus 200 includes a phone number storage unit 250. The phone number storage unit 250 stores a phone number for originating a first call and a phone number for originating a second call so that the phone number for originating the first call and the phone number for originating the second call correspond to each other for each of a plurality of telephone terminals that may be the first telephone terminal 100.

The phone number for originating the first call is a phone number used as a destination number when the telephone relay apparatus 200 originates a call to the first telephone terminal 100. The phone number for originating the first call, for example, is included in the connection request transmitted from the request transmission apparatus 110 as the phone number of the first telephone terminal 100. The phone number for originating the second call is a phone number used as an origination number when the telephone relay apparatus 200 originates a call to the second telephone terminal 300.

In FIG. 2, the description of the configuration of portions that are not related to the essence of the invention will not be repeated. The respective configuration elements of the telephone relay apparatus 200 illustrated in FIG. 2 are not configurations per hardware unit, but show blocks per functional unit. The respective configuration elements of the telephone relay apparatus 200 are realized by any combination of hardware and software, mainly by a CPU of any computer, a memory, a program loaded in a memory to realize the configuration elements in the drawing, a storage unit such as a hard disk storing the program, and an interface for connecting to a network. It can be understood by those skilled in the art that there are various modifications of the method of realizing the configuration elements and the apparatus.

FIG. 3 is a diagram illustrating an example of data stored in the codec storage unit 210 in a table form. The codec storage unit 210 stores phone numbers and codec information so that the phone numbers and the codec information correspond to each other for each telephone terminal. With respect to a telephone terminal having a plurality of codecs, the codec storage unit 210 stores a phone number of the telephone terminal and information on a plurality of codecs so that one phone number and the information on the plurality of codecs correspond to each other.

FIG. 4 is a diagram illustrating an example of data stored in the phone number storage unit 250 in a table form. The phone number storage unit 250, as described above, stores a phone number for originating a first call and a phone number for originating a second call so that the phone number for originating the first call and the phone number for originating the second call correspond to each other for each of a plurality of telephone terminals that may be the first telephone terminal 100.

Figure 5:
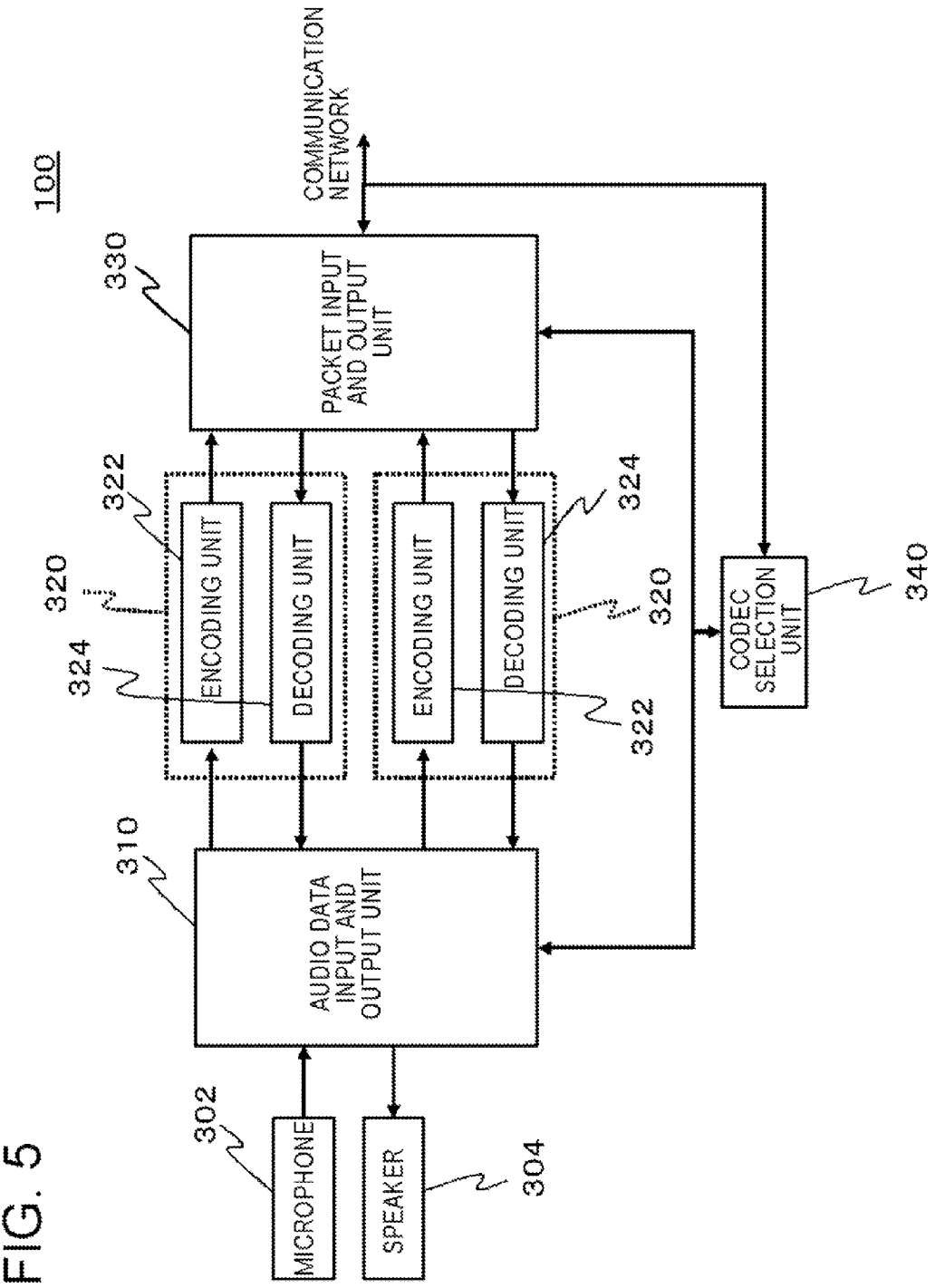
FIG. 5 is a block diagram illustrating an example of the functional configuration of a first telephone terminal.

FIG. 5 is a block diagram illustrating an example of the functional configuration of the first telephone terminal 100. The first telephone terminal 100, for example, is a portable communication terminal, and includes a microphone 302, a speaker 304, an audio data input and output unit 310, different types of audio codecs 320, a packet input and output unit 330, and a codec selection unit 340. The audio codec 320 includes an encoding unit 322 and a decoding unit 324.

The audio data input and output unit 310 outputs audio data input from the microphone 302 to the encoding unit 322 of the audio codec 320. The encoding unit 322 encodes the input audio data and outputs the encoded audio data to the packet input and output unit 330. The packet input and output unit 330 outputs the encoded audio data to the first telephone terminal 100 through the communication network 10 and the telephone relay apparatus 200 as audio packets.

Further the packet input and output unit 330 receives the audio packet from the first telephone terminal 100 through the communication network 10 and the telephone relay apparatus 200. The decoding unit 324 decodes the audio packets received by the packet input and output unit 330 to audio data. The audio data input and output unit 310 outputs the audio data decoded by the decoding unit 324 to the speaker 304.

The codec selection unit 340 receives the codec information through the communication network, and enables the audio data input and output unit 310 and the packet input and output unit 330 to use the audio codec that corresponds to the received codec information.

Figure 6:
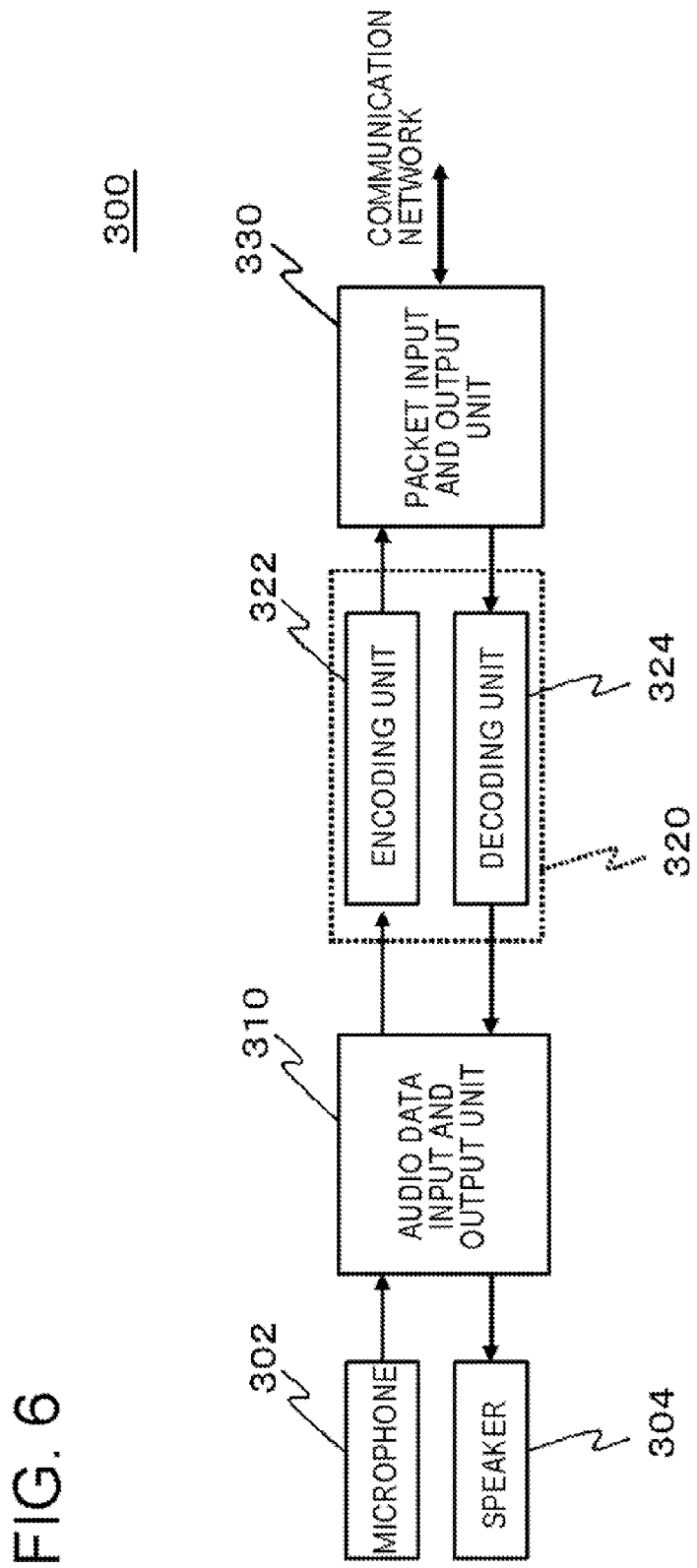
FIG. 6 is a block diagram illustrating an example of the functional configuration of a second telephone terminal.

FIG. 6 is a block diagram illustrating an example of the functional configuration of the second telephone terminal 300. The second telephone terminal 300 has the same configuration as the first telephone terminal 100 illustrated in FIG. 5 except for the point that the second telephone terminal 300 has one audio codec 320, but does not have the codec selection unit 340. However, the second telephone terminal 300 may have the same configuration as the first telephone terminal 100 illustrated in FIG. 5.

In FIGS. 5 and 6, the description of the configuration of portions that are not related to the essence of the invention will not be repeated. The respective configuration elements of the first telephone terminal 100 and the second telephone terminal 300 illustrated in FIGS. 5 and 6 are not configurations per hardware unit, but show per functional unit. The respective configuration elements of the first telephone terminal 100 and the second telephone terminal 300 are realized by any combination of hardware and software, mainly by a CPU of any computer, a memory, a program loaded in a memory to realize the configuration elements in the drawing, a storage unit such as a hard disk storing the program, and an interface for connecting to a network. It can be understood by those skilled in the art that there are various modifications of the method of realizing the configuration elements and the apparatus.

Figure 7:
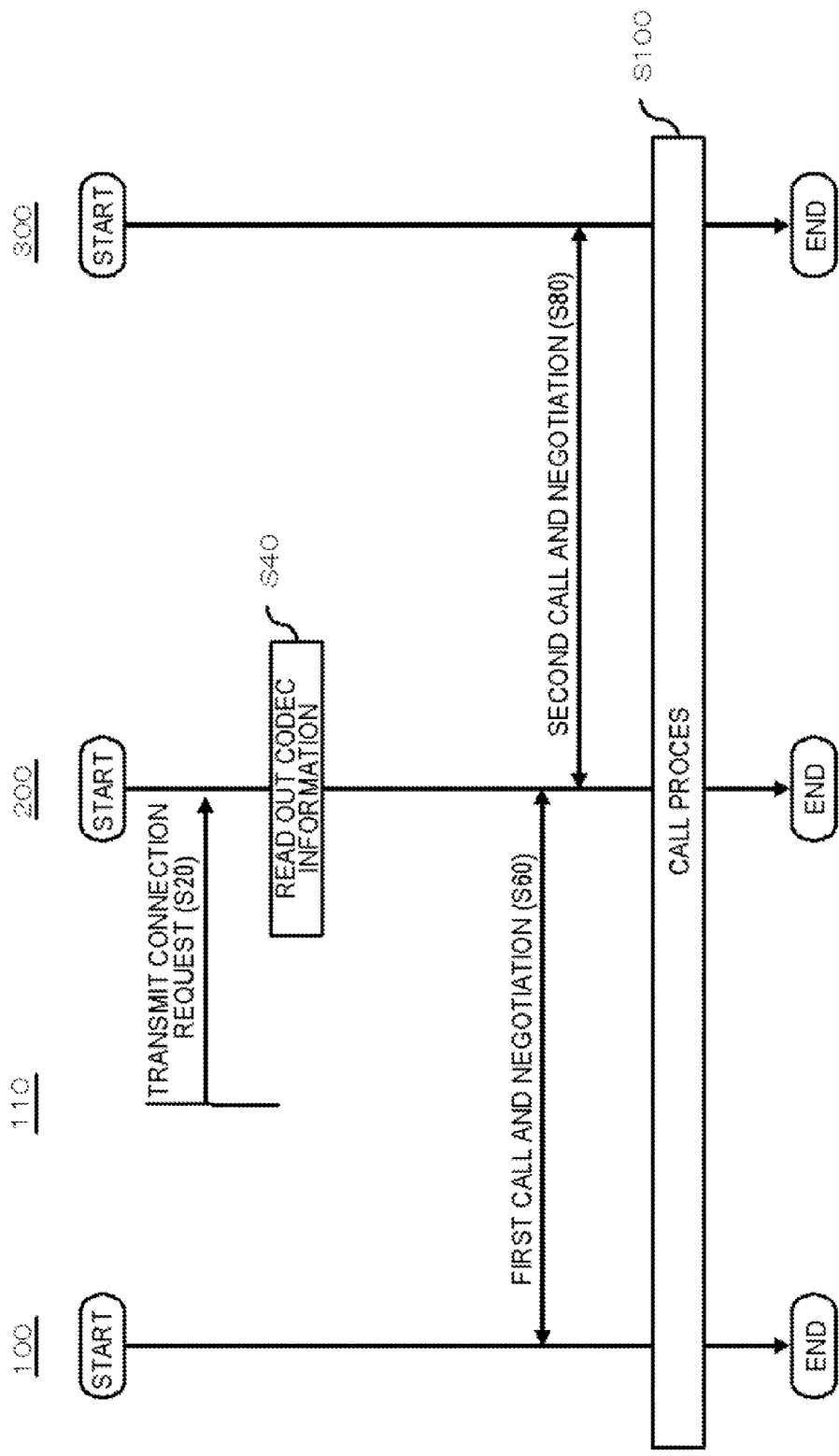
FIG. 7 is a flowchart illustrating an operation of a telephone relay apparatus in an environment illustrated in FIG. 1.

FIG. 7 is a flowchart illustrating an operation of the telephone relay apparatus 200 in the environment illustrated in FIG. 1. First, the request transmission apparatus 110 transmits to the telephone relay apparatus 200 by data communication, a connection request indicating that the first telephone terminal 100 makes a phone call to the second telephone terminal 300 (step S20). This connection request includes the phone number for originating a first call of the first telephone terminal 100 and the phone number of the second telephone terminal 300.

The connection request reception unit 220 of the telephone relay apparatus 200 receives the connection request. Then, the codec readout unit 230 of the telephone relay apparatus 200 reads out the codec information that corresponds to the phone number of the second telephone terminal 300, which is included in the connection request, from the codec storage unit 210 (step S40).

Then, the connection processing unit 240 originates a first call to the first telephone terminal 100 through the exchange 50. In this case, the connection processing unit 240 performs a negotiation process of a communication method with the first telephone terminal 100. In the negotiation process, the connection processing unit 240 transmits the codec information read out from the codec storage unit 210 to the first telephone terminal 100 (step S60).

Thereafter, when a user makes an input for responding to the first call, the first telephone terminal 100 performs a call connection with the connection processing unit 240 of the telephone relay apparatus 200. At this time, the first telephone terminal 100 selects and uses the audio codec 320 that corresponds to the codec information transmitted from the connection processing unit 240.

When the first call is connected, the connection processing unit 240 of the telephone relay apparatus 200 reads out the phone number for originating the second call that corresponds to the phone number of the first telephone terminal included in the connection request. Then, the connection processing unit 240 originates the second call to the second telephone terminal 300 by setting the read-out phone number for originating the second call as the origination number. At this time, the connection processing unit 240 performs the negotiation process of the communication method with the second telephone terminal 300 (step S80). In this negotiation process, the second telephone terminal 300 selects and uses the audio codec 320 that corresponds to the codec information read out in the step S40. When a user of the second telephone terminal 300 makes an input for responding to the second call, the second telephone terminal 300 performs a call connection with the connection processing unit 240 of the telephone relay apparatus 200. Accordingly, the first telephone terminal 100 and the second telephone terminal 300 can make a call through the connection processing unit 240 (step S100).

Next, the operation and effect of this embodiment will be described. In this embodiment, the codec storage unit 210 of the telephone relay apparatus 200 stores the codec information that specifies the audio codec used in the telephone terminal so that the codec information correspond to the phone number of the telephone terminal. The codec readout unit 230 of the telephone relay apparatus 200 reads out the codec information that corresponds to the phone number of the second telephone terminal 300, which is included in the connection request, from the codec storage unit 210, and the connection processing unit 240 transmits the codec information read out by the codec readout unit 230 to the first telephone terminal 100. Further, the first telephone terminal 100 makes a call using the encoding method that can be processed by the second telephone terminal 300, that is, using the audio codec.

Accordingly, the audio codecs of the first telephone terminal 100 and the second telephone terminal 300 become identical with each other, and thus the telephone relay apparatus 200 is not required to re-encode the audio packets transmitted from one of the first telephone terminal 100 and the second telephone terminal 300 in conformity with the codec of the other telephone terminal. Accordingly, the increase of the load for the telephone relay apparatus can be suppressed.

Figure 8:
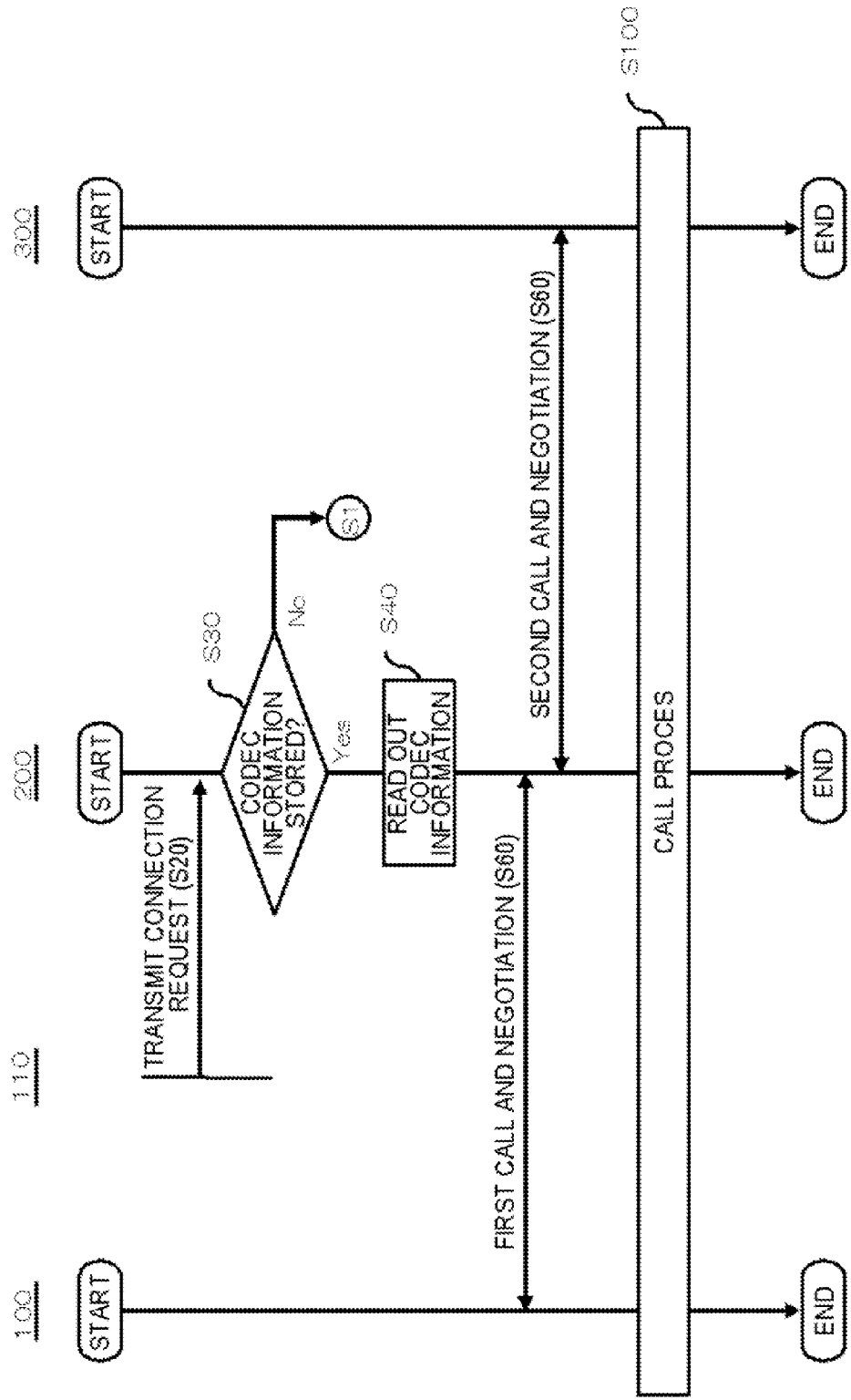
FIG. 8 is a flowchart illustrating a process performed by a telephone relay apparatus according to a second embodiment of the invention.
Figure 9:
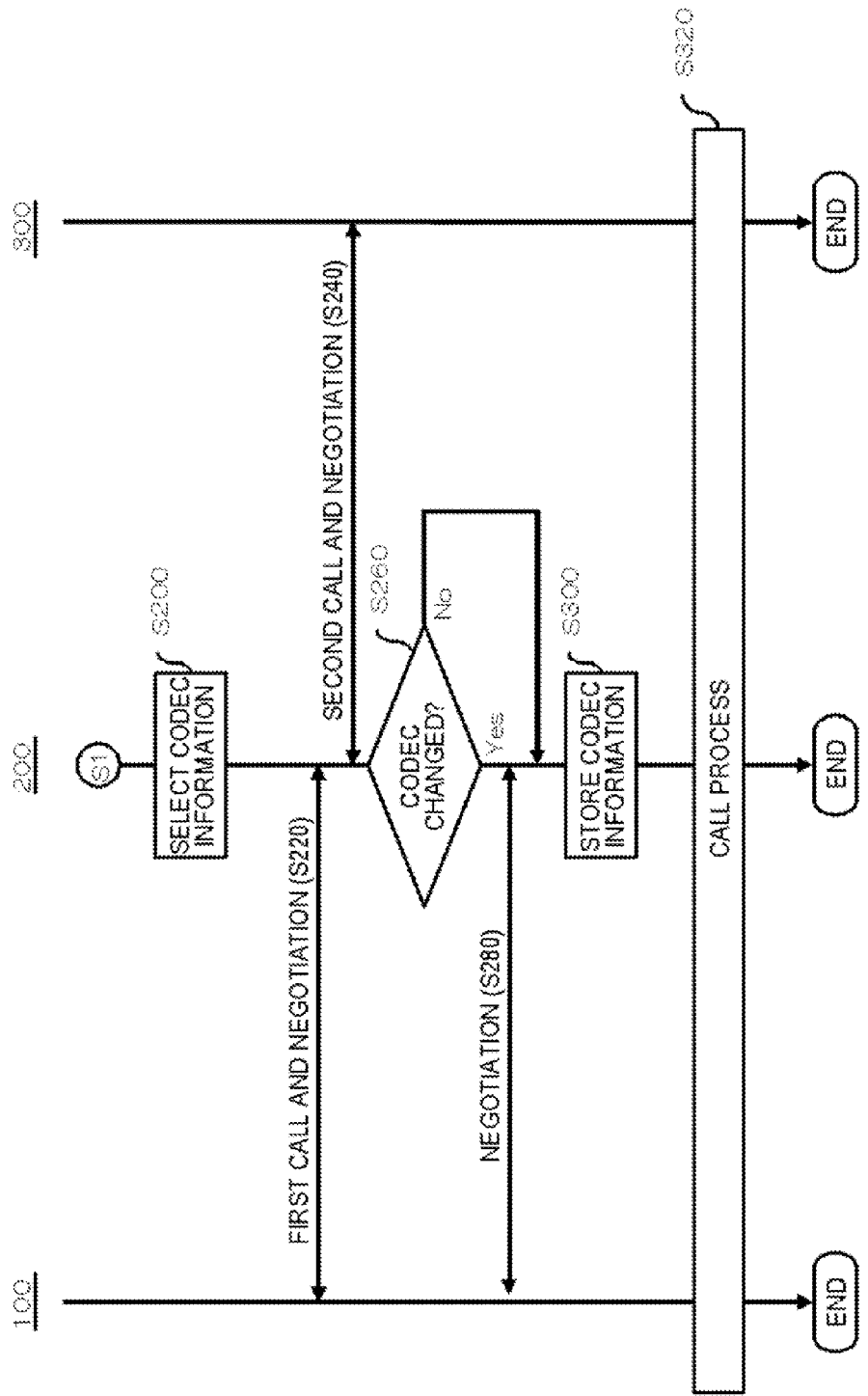
FIG. 9 is a flowchart illustrating a process performed by a telephone relay apparatus according to a second embodiment of the invention.

FIGS. 8 and 9 are flowcharts illustrating the process performed by the telephone relay apparatus 200 according to a second embodiment of the invention. Since the functional configuration of the telephone relay apparatus 200 that performs the process illustrated in the drawing is substantially the same as that of the first embodiment of the invention except for the point that the connection processing unit 240 has in advance the codec information of the plurality of audio codecs provided in the telephone terminal that may be the first telephone terminal 100, the detailed description thereof will not be repeated.

The process illustrated in the drawings is the same as that of the first embodiment except for the point that when the phone number of the second telephone terminal 300, which is included in the connection request, is not stored in the codec storage unit 210 of the telephone relay apparatus 200 ("No" in step S30), the process illustrated in FIG. 9 is performed.

When the phone number of the second telephone terminal 300, which is included in the connection request, is not stored in the codec storage unit 210 of the telephone relay apparatus 200 ("No" instep S30 of FIG. 8), the codec readout unit 230 outputs codec non-storage information indicating that no codec information is stored to the connection processing unit 240.

As illustrated in FIG. 9, when receiving the codec non-storage information, the connection processing unit 240 of the telephone relay apparatus 200 selects one of the codec information of the audio codecs provided in the first telephone terminal 100 (step S200). Then, the connection processing unit 240 originates the first call to the first telephone terminal 100 through the exchange 50. At this time, the connection processing unit 240 performs the negotiation process of the communication method with the first telephone terminal 100. In this negotiation process, the connection processing unit 240 transmits the codec information selected in the step S200 to the first telephone terminal 100 (step S220).

Then, when a user makes an input for responding to the first call, the first telephone terminal 100 performs a call connection with the connection processing unit 240 of the telephone relay apparatus 200. At this time, the first telephone terminal 100 selects and uses the audio codec 320 that corresponds to the codec information transmitted from the connection processing unit 240.

When the first call is connected, the connection processing unit 240 of the telephone relay apparatus 200 originates the second call to the second telephone terminal 300. At this time, the connection processing unit 240 performs the negotiation process of the communication method with the second telephone terminal 300 (step S240). In this negotiation process, the connection processing unit 240 transmits the codec information selected in the step S200 to the second telephone terminal 300. When having the audio codec 320 that corresponds to the received codec information, the second telephone terminal 300 selects and uses the audio codec 320. But, when not having the audio codec 320 that corresponds to the received codec information, the second telephone terminal 300 transmits the codec information of the audio codec 320 provided in the second telephone terminal 300 to the connection processing unit 240 in order to change the audio codec selected by the first telephone terminal 100.

The connection processing unit 240 receives the codec information from the second telephone terminal 300, and when it is necessary to change the audio codec 320 ("Yes" in step S260), it performs the negotiation again with the first telephone terminal 100 (step S280). Specifically, the connection processing unit 240 transmits the codec information received from the second telephone terminal 300 to the first telephone terminal 100, and changes the audio codec 320 of the first telephone terminal 100.

Then, the connection processing unit 240 stores the codec information of the audio codec used by the second telephone terminal 300 in the codec storage unit 210 so that the codec information of the audio codec corresponds to the phone number of the second telephone terminal 300 (step S300).

Thereafter, when a user of the second telephone terminal 300 makes an input for responding to the second call, the second telephone terminal 300 performs a call connection with the connection processing unit 240 of the telephone relay apparatus 200. Accordingly, the first telephone terminal 100 and the second telephone terminal 300 can make a call through the connection processing unit 240 (step S320).

Even in this embodiment of the invention, the same effect as that of the first embodiment can be obtained. Further, even in the case where the codec storage unit 210 does not store the codec information of the second telephone terminal 300, it is possible to conform the audio codec used in the first telephone terminal 100 to the audio codec of the second telephone terminal 300.

Further, since the codec information of the second telephone terminal 300 can be added to the codec storage unit 210, thus when the connection request for the same second telephone terminal 300 is made later, it is not necessary to re-perform the process illustrated in FIG. 9.

Figure 10:
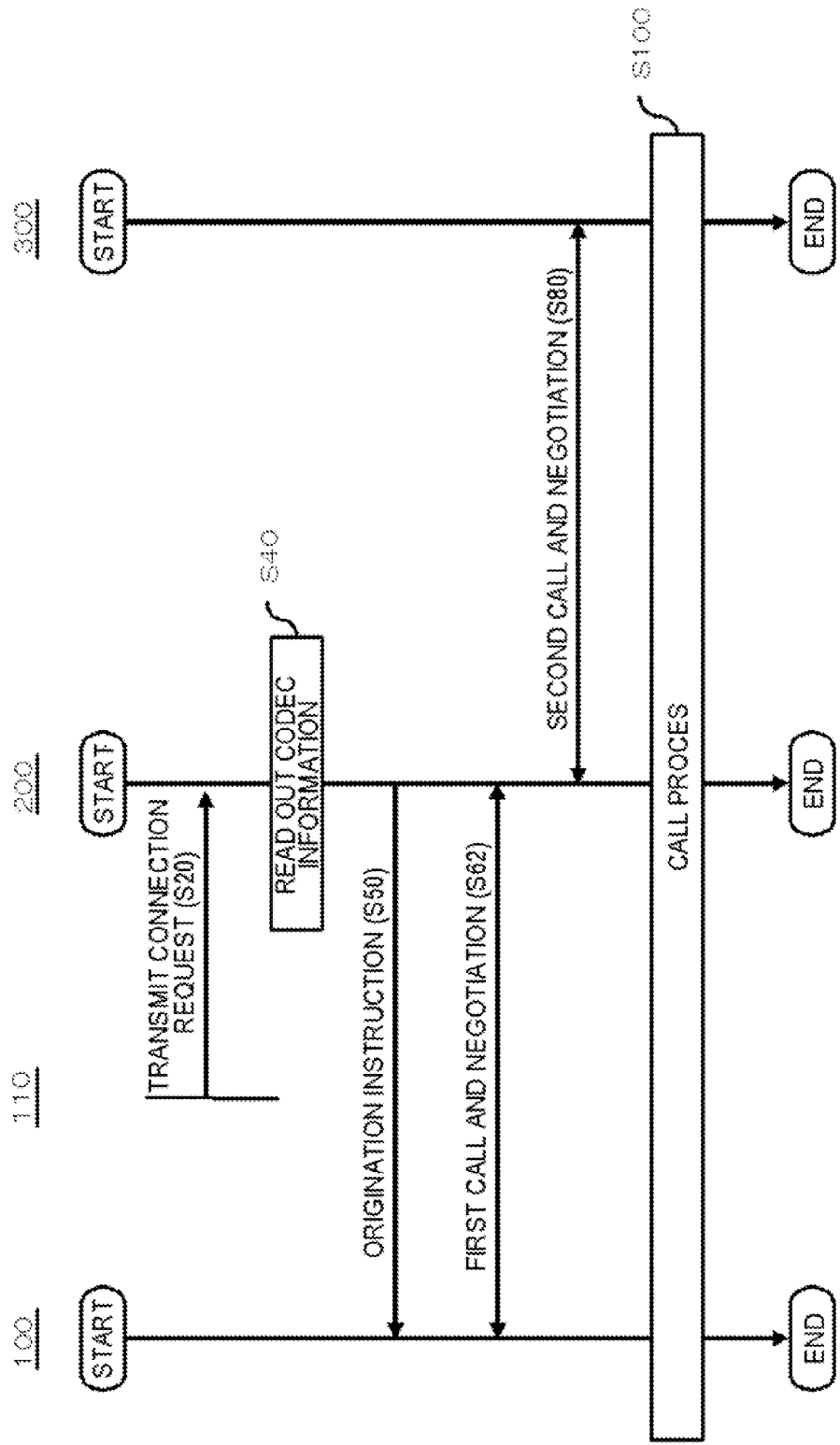
FIG. 10 is a flowchart illustrating a process performed by a telephone relay apparatus according to a third embodiment of the invention.

FIG. 10 is a flowchart illustrating a process performed by the telephone relay apparatus 200 according to a third embodiment of the invention. The functional configuration of the telephone relay apparatus 200 that performs the process illustrated in the drawing is substantially the same as that of the first embodiment of the invention, and thus the description thereof will not be repeated.

The process illustrated in the drawing is the same as that of the first or second embodiment of the invention except for the connection process between the telephone relay apparatus 200 and the first telephone terminal 100. FIG. 10 illustrates the same case as that of the first embodiment of the invention.

In this embodiment of the invention, when the codec readout unit 230 reads out the codec information (step S40), the connection processing unit 240 of the telephone relay apparatus 200 transmits an origination instruction to the first telephone terminal 100 through the data communication (step S50). When receiving the origination instruction, the first telephone terminal 100 originates the first call to the connection processing unit 240 of the telephone relay apparatus 200 (step S62). At this time, the first telephone terminal 100 performs the negotiation process with the connection processing unit 240, and makes the audio codec used in the first telephone terminal 100 into the audio codec that corresponds to the codec information read out in the step S40.

The following process (steps S80 and S100) is the same as that of the first or second embodiment of the invention, and thus the description thereof will not be repeated.

Even in this embodiment of the invention, the same effect as that of the first or second embodiment can be obtained.

Figure 11:
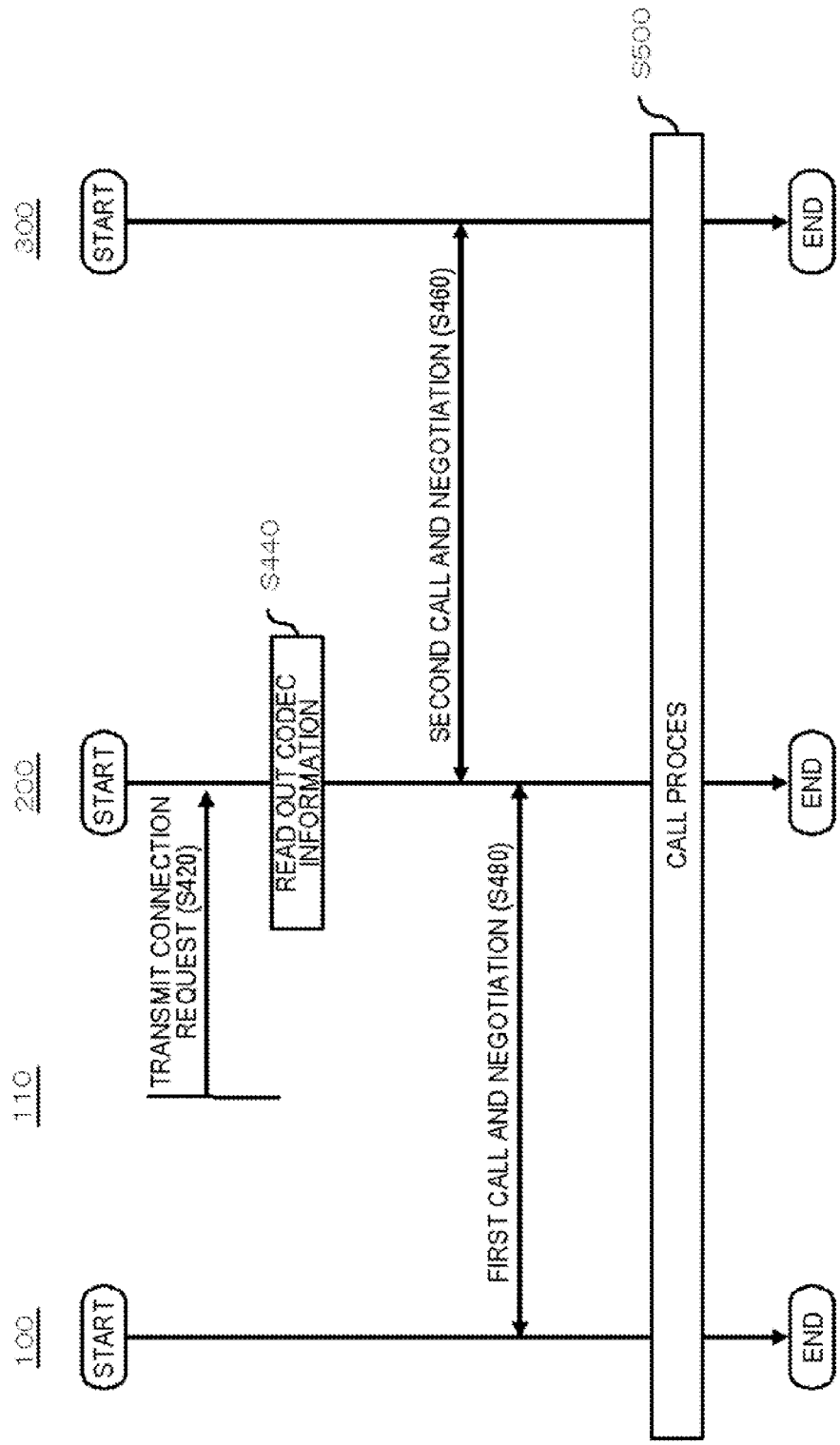
FIG. 11 is a flowchart illustrating a process performed by a telephone relay apparatus according to a fourth embodiment of the invention.

FIG. 11 is a flowchart illustrating a process performed by the telephone relay apparatus 200 according to a fourth embodiment of the invention. The functional configuration of the telephone relay apparatus 200 that performs the process illustrated in the drawing is substantially the same as that of the first embodiment of the invention except for the point that the codec storage unit 210 can store the phone numbers of the telephone terminals that may be the first telephone terminal 100, and the codec information of the audio codecs provided in the telephone terminal.

Further, the process illustrated in the drawing is the same as that of the first or second embodiment of the invention except for the point that the second call is first originated, and then the first call is originated after the call connection between the second telephone terminal 300 and the telephone relay apparatus 200 is established. FIG. 11 illustrates the same case as that of the first embodiment of the invention.

First, the request transmission apparatus 110 transmits the connection request to the telephone relay apparatus 200 through the data communication (step S420). The codec readout unit 230 reads out the codec information that corresponds to the phone number of the first telephone terminal 100 (step S440). Then, the connection processing unit 240 of the telephone relay apparatus 200 reads out the phone number for originating the second call that corresponds to the phone number of the first telephone terminal included in the connection request, and originates the second call by setting the phone number for originating the second call as the origination number. In this negotiation process, the connection processing unit 240 transmits the codec information read out from the codec storage unit 210 to the second telephone terminal 300 (step S460).

When a user makes an input for responding to the second call, the second telephone terminal 300 performs a call connection with the connection processing unit 240 of the telephone relay apparatus 200. At this time, the second telephone terminal 300 selects and uses the audio codec 320 that corresponds to the codec information transmitted from the connection processing unit 240.

When the second call is connected, the connection processing unit 240 of the telephone relay apparatus 200 originates the first call to the first telephone terminal 100. At this time, the connection processing unit 240 performs the negotiation process of the communication method with the first telephone terminal 100 (step S480). In this negotiation process, the first telephone terminal 100 selects and uses the audio codec 320 that corresponds to the codec information read out in the step S440. When a user of the first telephone terminal 100 makes an input for responding to the first call, the first telephone terminal 100 performs a call connection with the connection processing unit 240 of the telephone relay apparatus 200. Accordingly, the first telephone terminal 100 and the second telephone terminal 300 can make a call through the connection processing unit 240 (step S500).

Even in this embodiment of the invention, the same effect as that of the first or second embodiment of the invention can be obtained.

Figure 12:
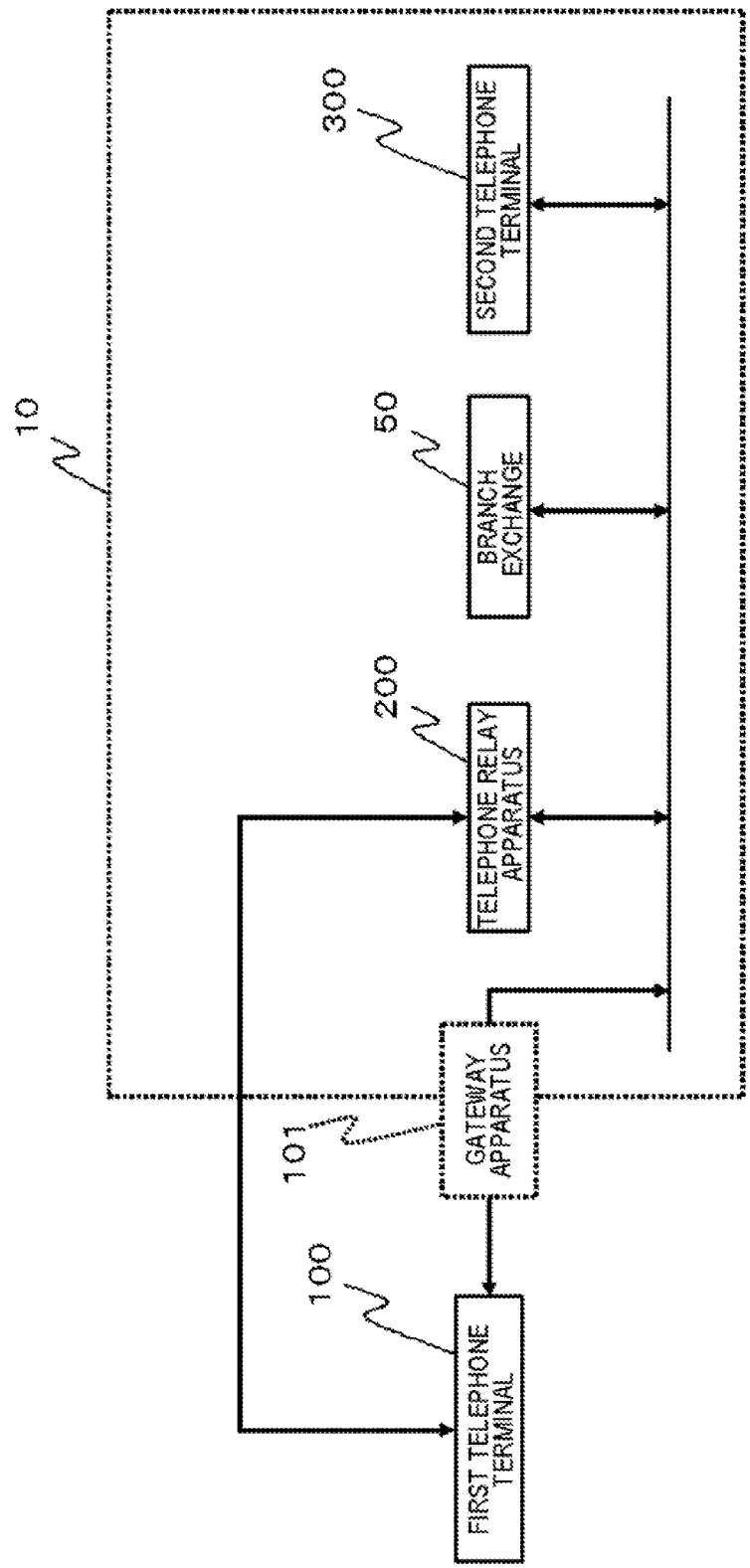
FIG. 12 is a diagram illustrating a use environment of a telephone relay apparatus according to a fifth embodiment of the invention.

FIG. 12 is a diagram illustrating a use environment of the telephone relay apparatus 200 according to a fifth embodiment of the invention, which corresponds to FIG. 1 according to the first embodiment of the invention. In the drawing, the telephone relay apparatus 200 is the same as anyone of those according to the first to fourth embodiments of the invention except for the point that the telephone relay apparatus 200 receives the connection request from the first telephone terminal 100, not from the request transmission apparatus 110, through the data communication network. In this case, it is not necessary that the telephone communication network and the data communication network are physically different from each other, and they may be logically different from each other.

Even in this embodiment of the invention, the same effect as that of anyone of the first to fourth embodiments of the invention can be obtained.

As described above, although the embodiments of the invention have been described with reference to the drawings, they are exemplary, and various configurations may be adopted in addition to those as described above.

This application is based on Japanese Patent Application No. 2009-150101 filed on Jun. 24, 2009, the disclosure of which is incorporated herein by reference in its entirety.

The invention claimed is:

1. A telephone relay apparatus comprising:
a codec storage unit storing phone numbers of a plurality of telephone terminals and codec information that indicates types of audio codecs provided in the telephone terminals so that the phone numbers and the codec information correspond to each other;
a connection request reception unit receiving a connection request from a first telephone terminal to a second telephone terminal, the connection request including the phone numbers of the first telephone terminal and the second telephone terminal;
a codec readout unit reading out the codec information from the codec storage unit, the codec information corresponding to the phone number of the second telephone terminal included in the connection request; and
a connection processing unit transmitting the codec information read out by the codec readout unit to the first telephone terminal, connecting to the first telephone terminal and the second telephone terminal, and receiving data from the first terminal that the first telephone terminal encodes using an audio code type indicated in the codec information transmitted by the connection processing unit, and transmitting to the second terminal the encoded data received from the first terminal.

2. The telephone relay apparatus according to claim 1, wherein the codec reading unit outputs codec non-storage information that indicates no codec information is stored to the connection processing unit when the codec information that corresponds to the phone number is not stored in the codec storage unit, and
wherein when receiving the codec non-storage information, the connection processing unit selects and transmits the codec information of the audio codec that the first telephone terminal uses to the first telephone terminal, and then transmits the same codec information as that of the first telephone terminal to the second telephone terminal.

3. The telephone relay apparatus according to claim 2, wherein when the connection processing unit receives the codec information of the audio codec that the second telephone terminal can use from the second telephone terminal after transmitting the codec information to the second telephone terminal, the connection processing unit transmits the codec information received from the second telephone terminal to the first telephone terminal.

4. The telephone relay apparatus according to claim 2, wherein the connection processing unit stores in the codec storage unit, the codec information that indicates the audio codec used in a call to the second telephone terminal so that the codec information corresponds to the phone number of the second telephone terminal.

5. The telephone relay apparatus according to claim 1, wherein the connection processing unit connects to the first telephone terminal and the second telephone terminal, by originating a first call to the first telephone terminal and originating a second call to the second telephone terminal.

6. The telephone relay apparatus according to claim 1, wherein the connection processing unit connects to the first telephone terminal and the second telephone terminal, by transmitting an origination instruction to the first telephone terminal through data communication, thereafter receiving a first call from the first telephone terminal and originating a second call to the second telephone terminal.

7. A telephone relay method comprising:
making a codec storage unit store phone numbers of a plurality of telephone terminals and codec information that indicates types of audio codecs provided in the telephone terminals so that the phone numbers and the codec information correspond to each other;
receiving a connection request from a first telephone terminal to a second telephone terminal, the connection request including the phone numbers of the first telephone terminal and the second telephone terminal, by a telephone relay apparatus;
reading out the codec information from the codec storage unit, the codec information corresponding to the phone number of the second telephone terminal included in the connection request, by the telephone relay apparatus;
transmitting the read-out codec information to the first telephone terminal and connecting to the first telephone terminal, the second telephone terminal by the telephone relay apparatus, and receiving data from the first terminal that the first telephone terminal encodes using an audio code type indicated in the codec information transmitted by the connection processing unit, and transmitting to the second terminal the encoded data received from the first terminal, by the telephone relay apparatus.

8. A non-transitory computer readable media which records a program for making a computer function as a telephone relay apparatus that relays a phone call between a first telephone terminal and a second telephone terminal, the program making the computer realize the functions of:
connecting to a codec storage unit storing phone numbers of a plurality of telephone terminals and codec information that indicates types of audio codecs of the telephone terminals so that the phone numbers and the codec information correspond to each other;
receiving a connection request from a first telephone terminal to a second telephone terminal, the connection request including the phone numbers of the first telephone terminal and the second terminal;
reading out the codec information from the codec storage unit, the codec information corresponding to the phone number of the second telephone terminal included in the connection request; and
transmitting the read-out codec information to the first telephone terminal, connecting to the first telephone terminal and the second telephone terminal, and receiving data from the first terminal that the first telephone terminal encodes using an audio code type indicated in the codec information transmitted by the connection processing unit, and transmitting to the second terminal the encoded data received from the first terminal.

* * * * *